UNITED STATES PATENT OFFICE.

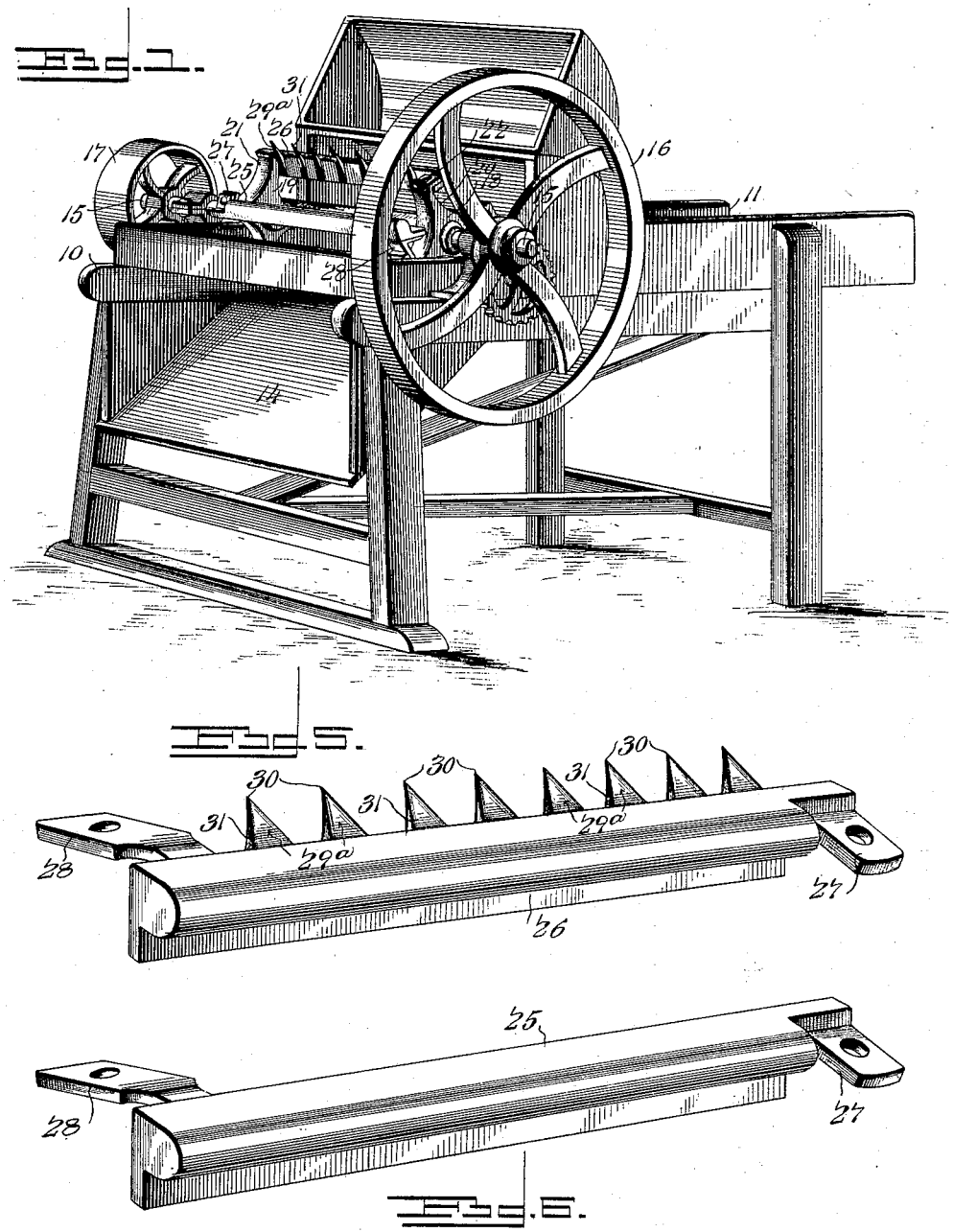

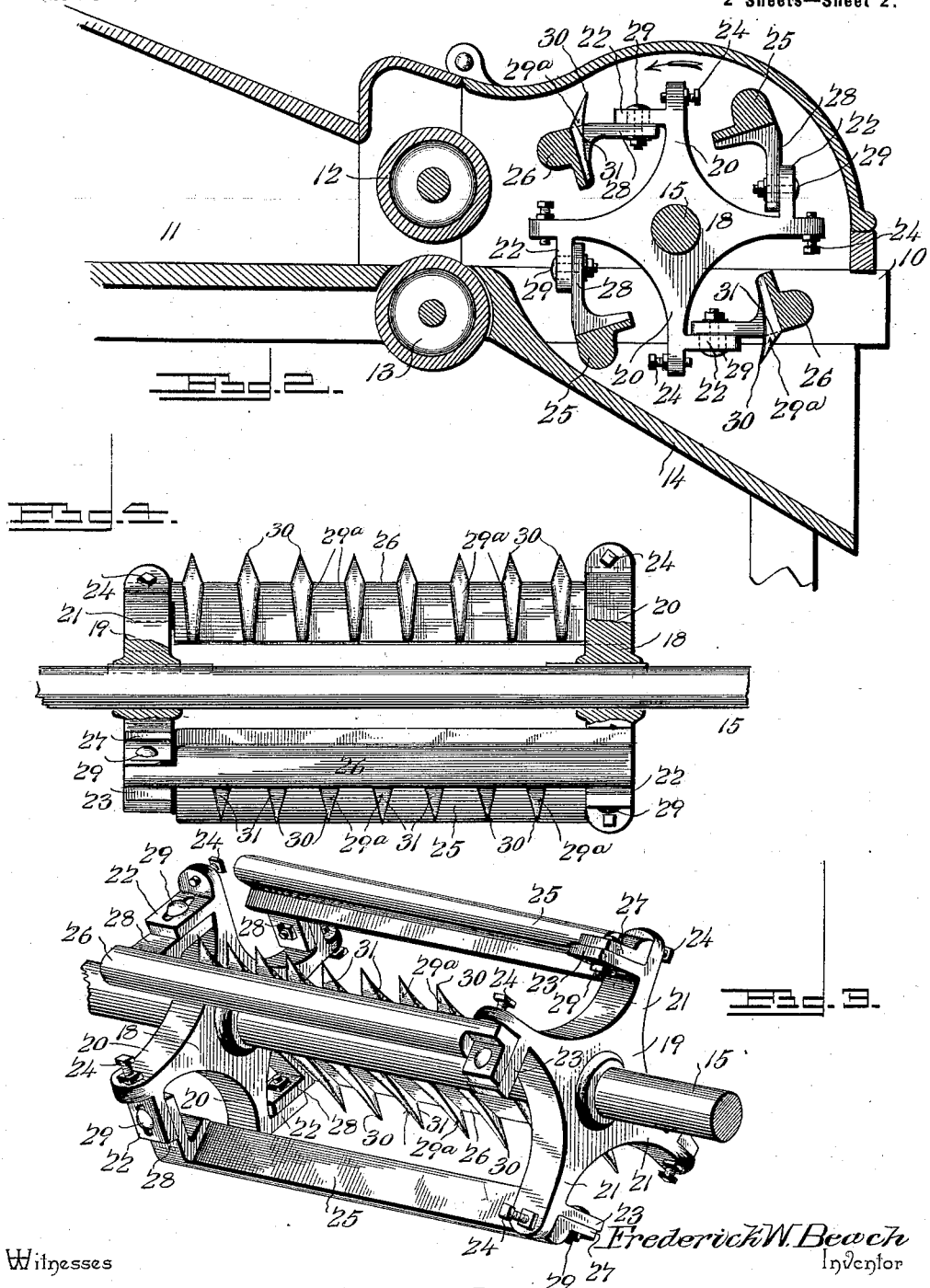

FREDERICK W. BEACH, OF BROOKSVALE, CONNECTICUT.

THRESHING ATTACHMENT FOR FODDER-CUTTING MACHINES.

SPECIFICATION forming part of Letters Patent No. 628,571, dated July 11, 1899.

Application filed October 7, 1898. Serial No. 692,873. (No model.)

*To all whom it may concern:*

Be it known that I, FREDERICK W. BEACH, a citizen of the United States, residing at Brooksvale, in the county of New Haven and State of Connecticut, have invented a new and useful Threshing Attachment for Fodder-Cutting Machines, of which the following is a specification.

My invention relates to a threshing attachment for use on fodder or ensilage cutting machines, and the prime purpose of the invention is to provide means by which the cutter-carrying cylinder of a fodder-machine may be converted into a threshing-cylinder to adapt the machine for the purpose of threshing grain.

A further purpose of the invention is to provide novel attachments by which the converted cylinder or head may be rendered efficient for the purpose of threshing the grain fed to the machine, and such threshing attachments are designed to be secured removably to the cylinder or head, so that they may be used interchangeably with ordinary cutters or knives, whereby the machine may be used for cutting fodder or for threshing grain by the simple interchange of the knives with the threshing-bars, or vice versa.

As is well known to those skilled in the art, the knives of a rotary head or cylinder, forming an element of a fodder-cutting machine, are fastened to the head removably in a spiral or inclined position to the cutter-head shaft, and to adapt my threshing attachments to a cutter-head of this style I provide a series of threshing-bars, each having fastening-arms arranged to extend at different angles from the threshing-bars for the purpose of applying and securing said bars to the spiders, so as to lie parallel to the cutter-head shaft. Each threshing-bar has a convexed working face which extends the full length of said bar, and the alternate threshing-bars are provided with tapered and rounded teeth arranged to sweep through the grain for the purpose of separating and loosening the grain from the straw.

The invention further consists in the novel combination of elements and in the construction and arrangement of parts, as will be hereinafter fully described and claimed.

To enable others to understand the invention, I have illustrated the same in the accompanying drawings, forming a part of this specification, and in which—

Figure 1 is a perspective view of an ensilage-cutter machine with my threshing-bars applied to the rotary cutter-head. Fig. 2 is a vertical longitudinal sectional view through the machine. Fig. 3 is a detail view of the head or cylinder removed from the machine. Fig. 4 is a vertical transverse section through the cylinder shown by Fig. 3. Fig. 5 is a detail perspective view of the toothed threshing-bar. Fig. 6 is a like view of a plain non-toothed bar.

Like numerals of reference denote like and corresponding parts in each of the several figures of the drawings.

In order that others skilled in the art may understand the invention, I have illustrated an ordinary fodder-cutting machine by Figs. 1 and 2 of the drawings, in which 10 designates the ordinary framework; 11, the feed trough or table; 12 13, the coacting feed-rolls; 14, the inclined chute, and 15 the rotary shaft which carries the head or cylinder that ordinarily supports the inclined or spiral cutters. This rotary shaft is journaled in suitable bearings over the inclined chute and in advance of the feed mechanism, and at one end this shaft is provided with a balance-wheel 16, while its other end supports the power-pulley 17. As is well known to those skilled in the art, the rotary shaft 15 is provided with a pair of spiders 18 19, which are made fast to said shaft for the purpose of rotating therewith, and the spider 18 is formed with a series of arms 20, which are disposed out of line with or in alternate relation to a series of arms 21 of the other spider 19. These disalined arms 20 21 of the pair of spiders 18 19 have the slotted lugs 22 23, on which are ordinarily secured the knives which occupy the spiral or inclined positions to the rotary shaft 15, and these knives are adjusted to the proper positions by the screws 24, supported in suitable threaded openings on the spider-arms. To convert this rotary head or cylinder into a threshing-cylinder, the knives or blades are removed from the slotted lugs of the spider-arms, and in lieu of the knives the threshing-bars 25 26 are secured to said slotted lugs of the spiders. Each threshing-bar 25 26 is provided with a longitudinal working face which is convex in cross-section, and each bar is furthermore provided with a pair of arms 27 28. The arm 27 at one end of each threshing-bar is shorter than the arm 28 at the opposite end of the bar. The arm 27 extends from one face of the threshing-bar, while the opposite arm 28 projects beyond the other side of said bar. The oppositely-extending arms at the extremities of the threshing-bar lie at different angular positions to the longitudinal axis of the threshing-bar, and this disposition or arrangement of the two arms on each threshing-bar enables the latter to be applied to the lugs on the disalined spider-arms of the cutter-shaft, so that the working faces of the threshing-bars lie parallel to the longitudinal axis of the rotary shaft 15. In applying the threshing-bar to a pair of the disalined arms of the spiders the short arm 27 is fitted on the top side of the slotted lug on one spider, while the long arm 28 is adjusted to lie beneath the slotted lug on the arm of the other spider, and the bars are secured firmly to the spiders by means of the bolts 29, which pass through suitable openings in the arms 27 28 and the slotted lugs of the spider-arms, so as to receive the nuts by which each threshing-bar is secured firmly to the cylinder or head.

It will be understood that each threshing-bar is provided with the cross-sectionally convex working face and with the pair of arms 27 28 arranged as described and adapted to be secured to the spider-arms of the rotary shaft in the manner specified for the working face of said threshing-bar to be parallel with the rotary shaft 15. The bars 25 are provided with the working faces only, but the bars 26 have a series of teeth 29$^a$. These teeth are fast or integral with the toothed bars 26 on the rear neutral faces thereof, but the teeth are projected or extended beyond one edge of each threshing-bar. The series of teeth are each tapered to the points 30, and each tooth is formed with a rounded face 31.

The bars 25 are secured to the spiders of the rotary shaft in alternate relation to the bars 26, which have the projecting threshing-teeth 29$^a$, and thus the rotary head or cylinder is equipped with a threshing-bar having a toothed surface in addition to its convexed smooth working surface and followed by a non-toothed threshing-bar with a convex smooth working face. The teeth of one threshing-bar 26 are in staggered relation to the teeth of the other toothed bar 26, and the teeth of one bar 26 are thus adapted to act on the grain in the intervals between the paths described by the teeth on the other bar 26, whereby the toothed bars are adapted to pass through the grain to loosen the latter and separate the grain from the straw. The cutter cylinder or head, which is equipped with the threshing-bars, is adapted to rotate close to the inclined chute or spout 14, so as to subject the grain passing thereover to the action of the threshing-bars and the teeth on the bars 26.

From the foregoing description, taken in connection with the drawings, it will be understood that the ordinary knives or cutters are secured in inclined positions to the spiders of the shaft 15 when the machine is used for the purpose of cutting fodder or ensilage, and the stalks or fodder are fed along the table and by the feed-rolls to the cutter-cylinder. To adapt the machine for threshing grain, the inclined knives are removed from the rotary head, and in lieu of said knives the toothed and smooth threshing-bars are secured in alternate order to the arms on the rotary shaft. The grain is fed to the table or trough and moved by the feed-rolls to the rotary cylinder or head, and in the rotation of this head the convexed working faces of the threshing-bars beat the straw and the teeth pass through the straw for the purpose of loosening the grain and separating the latter from the straw.

The interchange of the knives or blade for the threshing-bars, and vice versa, may be readily effected to convert the rotary cylinder from a cutter to a thresher, and in this connection it is important to observe that my attachments do not require the positions of the spiders to be changed, because the threshing-bars are peculiarly constructed for application to the spiders and to make said threshing-bars occupy parallel positions to the shaft of the cutter or cylinder, thus promoting convenience in the use of the blades and threshing-bars interchangeably.

Changes may be made in the form of some of the parts, while their essential features are retained and the spirit of the invention embodied. Hence I do not desire to be limited to the precise form of all the parts as shown, reserving the right to vary therefrom.

Having thus described the invention, what I claim is—

1. In a machine of the character set forth, the combination with the rotary cylinder having opposite disalined arms, of straight threshing-bars disposed parallel with the axis of the cylinder, and means for connecting the threshing-bars to corresponding opposite disalined arms.

2. In a machine of the class described, the combination with the rotary cylinder having opposite disalined arms, of a plurality of threshing-bars, each threshing-bar having a continuous longitudinal working face rounded in cross-section, and terminal fastening-arms extended respectively from opposite sides thereof, said terminal fastening-arms having detachable engagement with the disalined arms of the cylinder, substantially as set forth.

3. In a machine of the class described, the combination with the rotary cylinder, of a plurality of threshing-bars fitted to the cylinder, certain of said bars being provided with a working face, and a series of teeth extending in rear of such face, substantially as set forth.

4. In a machine of the class described, the combination with the rotary cylinder, of a plurality of threshing-bars fitted to said cylinder, certain of said bars being provided with a working face, and a series of tapered teeth extending in rear of such face, said teeth being tapered to points and having rounded sides or faces, substantially as set forth.

5. In a machine of the class described, the combination with the rotary cylinder having disalined spider-arms, of a plurality of straight threshing-arms lying parallel with the shaft of the cylinder, and each provided with attaching-arms extended from opposite sides thereof, and respectively of different lengths, said attaching-arms being detachably connected with the disalined spider-arms, substantially as set forth.

6. The combination with a shaft and the spiders having the arms thereof arranged out of line with each other and provided with the slotted lugs, of threshing-bars having the angular arms secured to opposite faces of the slotted lugs and the spider-arms, whereby the working faces of the threshing-bars are parallel to the rotary shaft, substantially as described.

7. In a machine of the class described, the combination with the rotary cylinder, of a plurality of threshing-bars fitted to the cylinder and lying parallel with the shaft thereof, all of said bars being provided with continuous straight longitudinal working faces rounded in cross-section, and certain of the bars having extended from the rear or neutral sides of said faces a plurality of teeth, substantially as set forth.

8. In a machine of the class described, the combination with the rotary cylinder, of a plurality of threshing-bars fitted to said cylinder and lying parallel with the shaft thereof, all of said bars being provided with continuous longitudinal cross-sectionally convex working faces, and the alternate bars being further provided with a plurality of teeth extended from the rear or neutral sides of the working faces, the teeth on the separate toothed threshing-bars being disposed in staggered relation, substantially as set forth.

In testimony that I claim the foregoing as my own I have hereto affixed my signature in the presence of two witnesses.

FREDERICK W. BEACH.

Witnesses:
JOHN H. SIGGERS,
ROBT. E. CRUMP.